G. A. LYON.
AUTOMOBILE BUFFER.
APPLICATION FILED AUG. 30, 1921. RENEWED JULY 15, 1922.

1,436,995.

Patented Nov. 28, 1922.

Inventor
George Albert Lyon
By his Attorney
Harry L. Duncan

Patented Nov. 28, 1922.

1,436,995

UNITED STATES PATENT OFFICE.

GEORGE ALBERT LYON, OF PHILADELPHIA, PENNSYLVANIA.

AUTOMOBILE BUFFER.

Original application filed January 5, 1920, Serial No. 349,420. Renewed January 20, 1922, Serial No. 530,728. Divided and this application filed August 30, 1921, Serial No. 496,827. Renewed July 15, 1922. Serial No. 575,273.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffers, of which the following is a specification taken in connection with the accompanying drawing.

This application is a division of my application Ser. No. 349,420 filed January 5, 1920, renewed as Serial No. 530,728, filed Jan. 20, 1922, and contains subject matter taken therefrom.

This invention relates especially to resilient buffers or bumpers for automobiles or other vehicles in which the buffer comprises a duplex buffer front which may be formed of spring steel strip or other resilient material, so that the initial impact or forward member of the buffer front may be spaced a considerable distance away from the auxiliary rear member, the whole buffer front forming a looped end element which may be adjustably or otherwise connected to attaching members adapted to support it from the automobile frame or other convenient part of the vehicle. One or more spring steel strips may be used to form the duplex buffer front and overlapping reenforcing strips or portions may be used with advantage adjacent the central part of the forward or rear member of the duplex buffer front between the attaching members or vehicle frame members, but in some cases both these members may be formed with such overlapping reenforcing strips to give additional strength. Many of these types of duplex buffer fronts may if desired be formed with a rearwardly bent or bowed rear member so as to give additional space between the two members adjacent the central portion of the duplex buffer front so that under impact or collision conditions a considerable degree of resilient yield of the forward member may take place so as to close the end loops before the central forward member is forced into engagement with the rear member of the buffer front to give still further increased resistance during the further resilient yield of the parts.

Figure 1:
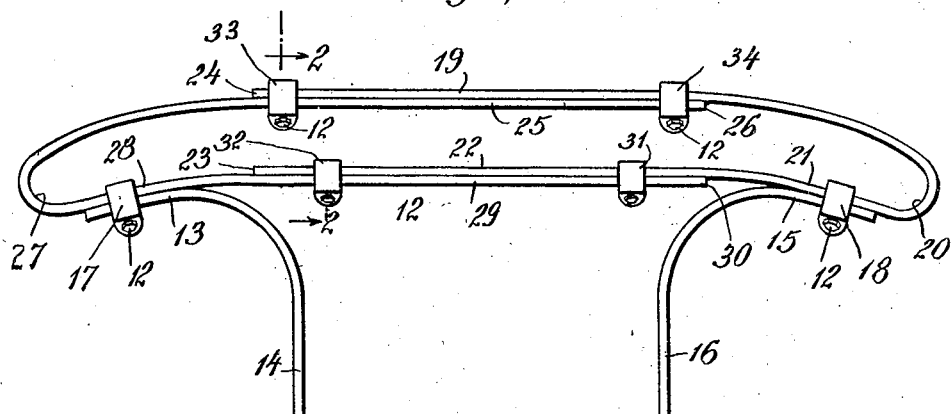

In the accompanying drawing which shown in a somewhat diagrammatic way a number of illustrative embodiments of this invention, Fig. 1 is a plan view showing an illustrative buffer.

Figure 2:
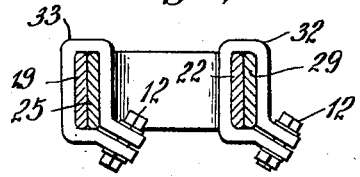
Figure 3:
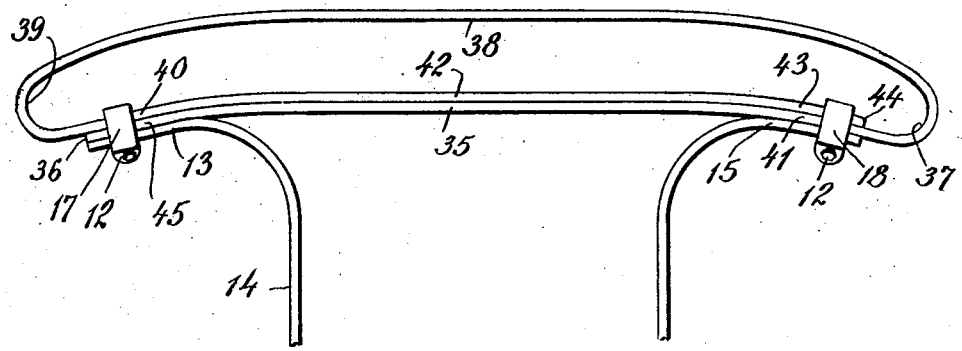

Fig. 2 is a corresponding transverse section thereof taken substantially along the line 2—2 of Fig. 1; and Fig. 3 is a plan view showing another illustrative arrangement.

The resilient duplex buffer front may be formed of one or more resilient strips of tempered spring steel, for example, which may be a quarter or three-eighths of an inch thick and two inches or so wide, and as indicated in Fig. 1 the buffer front may be formed of several strips of spring steel bent to form the end loops which are adapted to extend into protective position adjacent the wheels of the automobile or other vehicle while the ends of this spring strip may be carried inward so as to form overlapping reenforcing or other strengthening doubled strips or portions throughout a considerable extent of the central part of this initial impact or forward member of the buffer front, this double strip portion extending if desired substantially throughout the width between the buffer attaching arms or the vehicle from members to which they are secured.

The duplex buffer front is shown in Fig. 1 as rendered adjustable in width by being formed of two generally similar looped elements which may be provided with overlapping reenforcing connecting portions which may be adjustably clamped or connected together so that the width of the buffer front may be adjusted to correspond with the ordinary range of width of automobiles and similar vehicles. One of these loop elements may comprise the end loop 20 and the connected strips 19, 21, 22 while the corresponding element may have the loop end 27 and the connected portions 25, 28 and 29. As indicated the ends of these loop elements 23, 24 and 26, 30 may be located in line with or somewhat outside of the connected attaching member 14, 16 of generally familiar construction, so that overlapping reenforced portions may thus be formed in both the forward and rear members of the duplex buffer front to which attaching members, such as 14, 16 may be adjustably or if desired rigidly connected in which case the lateral adjustment between the looped elements of the buffer front simultaneously adjusts the distance between the attaching members. These overlapping connecting portions may be adjustably secured together and rigidly clamped in vertically aligned cooperating position by any suitable form of clamping devices such as the clips 31, 32, 33 and 34 of construction similar to what has been described in the Lyon Patent No. 1,198,246 of September 12, 1916, and which may be of the form illustrated in greater detail in Fig. 2. It is sometimes desirable to have the clamping devices somewhat out of line on the forward and rear members of the duplex buffer front so as to prevent undesirable contact between these clamping devices when the members are forced together under collision condition, the rear strips being preferably connected together at less separated points as indicated in Fig. 1. These spring steel or other resilient strips may advantageously have considerably greater vertical width than thickness, as indicated in Fig. 2, in which, however, the thickness is somewhat exaggerated for greater clearness, so that the buffer elements have a much greater degree of vertical stiffness as compared to their resilient yielding in horizontal directions under collision conditions. This form of construction also has the advantage that the buffer front may be shipped and sold in more compact condition when the loop elements are taken apart and separated from the attaching members and of course one of the loop members may be made sufficiently wider than the other, if desired, or otherwise packed, so that they can be nested together in such crated shipping condition.

Fig. 3 shows still another illustrative form of duplex buffer front in which the overlapping reenforced portion constitutes the auxiliary rear member of the buffer front which may, if desired, be formed of a single strip of tempered spring steel or other suitable resilient material. The initial impact forward member 38 may have as in the other cases the end loops 37, 39 which may extend backward slightly and the ends of this strip may be brought together into overlapping reenforcing position to form the overlapping portions 35, 42 throughout the central part of the auxiliary rear member and also throughout the straight connecting portions 41, 42 and 40, 45 if desired on either side of the buffer. A neat and strong appearance is thus given to the buffer especially when the ends 36, 44 of this front strip are arranged substantially even with the ends of the attaching members 14, 16 which may be adjustably or otherwise clamped or connected thereto as by the clamping devices, such as 17, 18 of the type previously described, for instance. With this construction a more resilient and readily yielding initial impact forward member is provided which under collision conditions engages the auxiliary rear member of the buffer front after it has been forced backward a number of inches and then the full strength of all of the resilient strips comes into play to resiliently resist and absorb the collision impact in the general manner above indicated. All of these types of construction may of course have the attaching members so clamped or connected to the other parts as to fit automobile frames of any usual or standard widths which is highly desirable from the commercial standpoint. Also as indicated the cooperating connecting portions of the attaching members and buffer front may be substantially straight so that this width adjustment of the attaching members may maintain them in substantially parallel position under all ordinary conditions.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims.

1. The automobile buffer comprising a duplex buffer front formed of two resilient U-shaped steel strips and having end loops formed of the bends of said strips and adapted to extend into protective position adjacent the vehicle wheels and connecting means adjustably connecting the end portion of each of said strips to the cooperating portion of the other strip in substantial contact therewith and forming an initial impact forward member and an auxiliary rear impact member spaced apart at least adjacent the central part of the buffer, said impact members being of double thickness overlapping reenforcing construction throughout their central portions and said connecting means being considerably more separated in said front impact member than in said rear impact member, the rear impact portion of said buffer front being formed with connecting portions and cooperating adjustably connected spring steel strip attaching members to support the buffer from the frame members of an automobile.

2. The automobile buffer comprising a duplex buffer front formed of two resilient U-shaped steel strips and having end loops formed of the bends of said strips and adapted to extend into protective position adjacent the vehicle wheels and connecting means adjustably connecting the end portion of each of said strips to the cooperating portion of the other strip in substantial contact therewith and forming an initial impact forward member and an auxiliary rear impact member spaced apart at least adjacent the central part of the buffer, said impact members being of double thickness reenforced construction throughout their central portions and said connecting means being considerably more separated in said front impact member than in said rear impact member, and cooperating attaching members to support the buffer from the frame members of an automobile.

3. The automobile buffer comprising a duplex buffer front formed of two substantially resilient U-shaped steel strips and having end loops formed of the bends of said strips, and connecting means connecting the end portion of each of said strips to the cooperating portion of the other strip in substantial contact therewith and forming an initial impact forward member and an auxiliary rear impact member spaced apart at least adjacent the central part of the buffer, said initial impact member being of double strip stiffened reenforced construction throughout its central portion and said connecting means being considerably more separated in said front impact member than in said rear impact member, the rear impact portion of said buffer front being formed with connecting portions adjacent said end loops and connected attaching members to support the buffer from the frame members of an automobile.

4. The automobile buffer comprising a duplex buffer front formed of two substantially resilient U-shaped steel strips and having end loops formed of the bends of said strips, and connecting means connecting the end portion of each of said strips to the cooperating portion of the other strip in substantial contact therewith and forming an initial impact forward member and an auxiliary rear impact member, said initial impact member being of double strip stiffened reenforced construction throughout its central portion, the rear impact portion of said buffer front being formed with connecting portions adjacent said end loops and connected attaching members to support the buffer from the frame members of an automobile.

5. The automobile buffer comprising a duplex buffer front formed of two U-shaped pieces of resilient steel strip and having end loops adapted to extend into protective position adjacent the vehicle wheels, and connecting means adjustably securing the intermeshing ends of said U-shaped pieces and forming an initial impact forward member and an auxiliary rear impact member having their central portions formed of multiple strip stiffened construction and spaced apart at least adjacent the central part of the buffer, and cooperating steel strip attaching members to support the buffer front from the frame members of an automobile.

6. The automobile buffer comprising a duplex buffer front formed of two U-shaped pieces of resilient steel strip and having end loops, and connecting means securing the intermeshing ends of said U-shaped pieces and forming an initial impact forward member and an auxiliary rear impact member having their central portions formed of multiple strip stiffened construction and spaced apart at least adjacent the central part of the buffer, and cooperating attaching members to support the buffer front from the frame members of an automobile.

7. The automobile buffer comprising a duplex buffer front formed of two U-shaped pieces of steel strip and having end loops adapted to extend into protective position adjacent the vehicle wheels and connecting means securing intermeshing portions of said pieces and forming an initial impact forward member and an auxiliary rear impact member, one of said impact members having its central portion formed of multiple strip stiffened construction and cooperating steel strip attaching members connected to said buffer front adjacent said end loops to support the same from the frame members of an automobile.

8. The duplex buffer front formed of two U-shaped pieces of resilient steel strip and having end loops adapted to extend into protective position adjacent the vehicle wheels and connecting means adjustably securing intermeshing end portions of said U-shaped pieces and forming an initial impact forward member and an auxiliary rear impact member, one of which has its central portion formed of multiple strip stiffened construction and which are spaced apart at least adjacent the central part of the buffer.

9. The duplex buffer front formed of two pieces of resilient steel strip and having end loops adapted to extend into protective position adjacent the vehicle wheels and connecting means securing intermeshing end portions of said pieces and forming an initial impact forward member and an auxiliary rear impact member, one of which has its central portion formed of multiple strip stiffened construction.

10. The duplex buffer front comprising two U-shaped pieces of steel strip and having end loops and connecting means securing intermeshing end portions of said U-shaped pieces and forming impact members including an initial impact member having its central portion formed of multiple strip stiffened construction.

11. The automobile buffer comprising a duplex buffer front formed of two substantially resilient bent steel strips and having end loops formed of the bends of said strips, and connecting means connecting the end portion of each of said strips to the cooperating portion of the other strip in substantial contact therewith and forming an initial impact forward member and an auxiliary rear impact member spaced apart at least adjacent the central part of the buffer, said initial impact member being of double strip stiffened reenforced construction throughout its central portion and said connecting means being considerably more separated in said front impact member than in said rear impact member, and connected attaching members to support the buffer from the frame members of an automobile.

12. The automobile buffer comprising a duplex buffer front formed of two bent pieces of resilient steel strip and having end loops, and connecting means securing the inter-meshing ends of said pieces and forming an initial impact forward member and an auxiliary rear impact member having their central portions formed of multiple strip stiffened construction and spaced apart at least adjacent the central part of the buffer, and cooperating adjustably connected attaching members to support the buffer front from the frame members of an automobile.

13. The automobile buffer comprising a duplex buffer front formed of two bent pieces of steel strip and having end loops adapted to extend into protective position adjacent the vehicle wheels and connecting means securing intermeshing portions of said pieces and forming an initial impact forward member and an auxiliary rear impact member, one of said impact members having its central portion formed of multiple strip stiffened construction and cooperating steel strip attaching members connected to said buffer front adjacent said end loops to support the same from the frame members of an automobile.

14. The duplex buffer front formed of two bent pieces of resilient steel strip and having end loops adapted to extend into protective position adjacent the vehicle wheels and connecting means adjustably securing intermeshing end portions of said pieces and forming an initial impact forward member and an auxiliary rear impact member, one of which has its central portion formed of multiple strip stiffened construction and which are spaced apart at least adjacent the central part of the buffer.

15. The duplex buffer front comprising two bent pieces of steel strip and having end loops and connecting means securing intermeshing portions of said pieces and forming impact members including an initial impact member having its central portion formed of multiple strip stiffened construction.

GEORGE ALBERT LYON.